United States Patent Office 3,038,937
Patented June 12, 1962

3,038,937
RESOLUTION PROCEDURE AND
INTERMEDIATES THEREFOR
William T. Cave, Dayton, Ohio, assignor to Monsanto Chemical Company, St. Louis, Mo., a corporation of Delaware
No Drawing. Filed Dec. 13, 1956, Ser. No. 627,985
9 Claims. (Cl. 260—534)

The present invention is directed to the resolution of glutamic acid racemates into optically active components. The invention is further directed to aqueous solutions containing certain concentrations of glutamic acid which are useful in such resolutions.

An object of the present invention is to provide an efficient and practical method of resolving racemic mixtures of glutamic acid into its optical isomers.

It is well known that optically active compounds often occur in nature in the form of a single isomer, e.g., the L-form. It is also well known that often one form of an $\alpha$-amino acid, usually the L-form, is useful for nutritional, medicinal, and other uses while its enantiomorph has little or no utility for the same purpose. A great deal of research has been directed to finding ways of resolving optically active amino acids into their separate isomers. However, most of the prior art procedures for resolving $\alpha$-amino acids are unsatisfactory, as they involve the preparation of diasterioisomers, or are otherwise tedious and impractical.

The separate isomers of glutamic acid have many valuable uses. For example, both the L-form and D-form are useful as food flavoring materials, the L-form being used commercially for such purpose (Ac'cent). The resolution of synthetic glutamic acid therefore produces two valuable isomers. As the L-form can be obtained from some natural sources, it is possible that the greatest utility for the present resolution procedure would lie in the production of the D-form. The D-form has a number of valuable specialized uses, e.g., it is useful in the process described in Patent No. 2,766,286 to Vitangelo D'Amato et al.

Every optically active chemical compound has its own special crystallization characteristics. These characteristics depend on such factors as the solubility of the compound in a particular solvent, and the relative tendencies to supersaturation of the D-, L-, and racemic forms under particular crystallization conditions. In resolving a racemate it is not desired to crystallize the racemate as such; it would therefore appear logical to use non-crystallizing amounts of the racemate, i.e., amounts of the racemate which would not crystallize under the resolution conditions. However, in the resolution of glutamic acid racemate in water it has surprisingly been found necessary to use crystallizing amounts of the racemate, i.e., amounts of the racemate which would crystallize under the same conditions of time and temperature but in the absence of the optically active form used in the resolution procedure.

Unless specified otherwise, such terms as "optical isomer," "optically active form," "L-form," etc. are generally used herein with regard to the amount of the particular modification which is present as such in the system aside from the presence of the modification as a portion of a racemate; i.e., the terms refer to the amount of a form in excess over its enantiomorphic form. To emphasize this aspect, the words "excess" or "pure" are occasionally used with the above terms.

As glutamic acid is ordinarily found in the form of its monohydrate and is difficult to obtain in the anhydrous state, the term "glutamic acid" is generally considered herein to refer to the monohydrate. However, the resolution of any other form of glutamic acid by the herein-described procedure is within the purview of the present invention.

My crystallization procedure involves dissolving an amount of the DL-form of glutamic acid in a solvent in which it is sparingly soluble, usually by heating the compound and the solvent, adding a small amount of either the D- or L-form of the compound, converting the solution into a supersaturated state, e.g., by cooling, seeding the solution with a small amount of the previously added enantiomorph, and separating the resulting crystals from the solution after a suitable time interval. Alternatively, the racemate and the separate D- or L-form can be dissolved at the same time, and the procedure carried out as above.

In the examples and tables below, the following crystallization procedure was utilized, except when specified otherwise.

The charge of racemate and optically active modification was weighed into a test tube and the solvent was added. The test tube was equipped with a mercury seal stirrer and a semi-ball joint side arm, to which a condenser and drying tube were attached. The stirrer was started, and thorough agitation was maintained throughout the rest of the procedure. The contents of the tube were raised quickly to a higher temperature, e.g., 65° C., and kept there for a short time, e.g., five minutes. The solution was then cooled by a hexane bath at a lower temperature, e.g., 20° C., and after one minute, the solution was seeded with the optically active modification. Cooling was continued for 30 minutes, and then the tube was removed and the supernatant fluid separated from the crystalline solids by suction filtration of the contents through a glass tube containing a sintered glass disc. The crystallized solids were dried to a constant weight. The amount of one enantiomorph present in excess in the solids was determined by measuring (with a Kern polarimeter) the rotation of a 1.75 N hydrochloric acid solution containing the solids in known concentration and calculating the amount of separate enantiomorph from the known specific rotation of the enantiomorph in hydrochloric acid.

Some of the preliminary tests to determine the quantity of glutamic acid which would remain in solution at stated temperatures, after seeding, are also recorded in the examples and tables.

EXAMPLE 1

By dissolving DL-glutamic acid monohydrate in distilled water at 65° C., cooling 1 minute at 20° C., seeding with the DL-form, and cooling an additional 45 minutes at 20° C., and then determining the amount of glutamic acid in aliquots of the solution, the following solubility data were obtained:

| Amount Dissolved, gram | Amount Remaining in 10 ml. Solution, gram |
|---|---|
| 0.2500 | 0.2075 |
| 0.3000 | 0.1986 |

The above data indicate that the maximum supersaturation amount for glutamic acid in 10 ml. aqueous solution at 20° C. for 45 minutes is in the neighborhood of 0.22 gram. The amount could be determined more precisely by additional trials, but the above value is a sufficient guide to attempt resolution procedures.

In a procedure similar to the above except for the use of a 30-minute crystallization (cooling) time, the maximum supersaturation amount was indicated as about 0.23–0.24 gram.

EXAMPLE 2

In 10 ml. water, 0.2400 gram DL-glutamic acid monohydrate and 0.0600 gram of the L-form of the same compound were dissolved by heating to 65° C. The solution was then cooled in a hexane bath at 20° C. After cooling for 1 minute, the solution was seeded with 0.0160 gram of the L-form and maintained at 20° C. for an additional 60 minutes. Filtration of the solution gave 0.0690 gram of solids. In 3 ml. of 1.75 N hydrochloric acid, a 0.0633 gram fraction of the solids gave an average rotation of $\alpha = 0.675°$. From this rotation the concentration C of the active form in grams/100 ml. was calculated:

$$C = \frac{\alpha \times 100}{[\alpha]_D^{25} \times 2} = \frac{0.675 \times 100}{2 \times 28.6}$$

and the amount of L-form in the 0.0690 gram of solids would be $$C \times \frac{3}{100} \times \frac{0.0690}{0.0633} = 0.0386 \text{ gram}$$

Although the precipitated solids were higher in the L-form than the starting mixture, the 0.0386 gram of L-form was smaller than the 0.0600+0.0160 gram of L-form in excess, so no resolution was achieved.

In a substantial repetition of the above procedure, except for using finely ground seed (0.0174 gram L-form), 0.0623 gram of L-form crystallized; this was less than the excess L-form present in the system, 0.0774 gram. All of the separated solids were the L-form, but no resolution was achieved. It can be seen that such minor factors as the fineness of the seed can cause considerable variation in results.

The specific rotation for use in calculating the concentration above was obtained by measuring the rotation of solutions of the L-form in 1.75 N hydrochloric acid in concentrations of 7 grams/100 ml. and then calculating the specific rotation $[\alpha]_D^{25} = \pm 28.6°$ in 7% solution of 1.75 N hydrochloric acid.

EXAMPLE 3

In 40 ml. of water 0.5 gram of DL-glutamic acid monohydrate and 0.15 gram of the L-form of the same were dissolved at 40° C. The solution was cooled to 0° C. and seeded with the L-form. Then 5 ml. of ethyl alcohol was added dropwise over a 15-minute period while the 0° C. temperature was maintained. The weight of precipitated solids was 0.2034 gram. A 0.1835 gram fraction of these solids in 3 ml. of 1.75 N hydrochloric acid gave an average rotation of 3.55°, from which it was determined that all the solids were the L-form. Since an excess of only 0.1674 gram L-form had been present in the system, it is clear that resolution has been achieved.

EXAMPLE 4

In a resolution procedure utilizing 0.2400 gram of DL-glutamic acid monohydrate and 0.0600 gram of the L-form of the same in 10 ml. of water, 0.0174 gram of the L-form as seed, a crystallization temperature of 0° C., and a crystallization time of one hour, 0.1164 gram of the 0.1174 gram of solids which separated, was the L-form. The purity (P) is calculated by dividing the weight of pure isomer in the separated solids by the weight of the separated solids, and in this case equals $$\frac{0.1164}{0.1174}$$

or approximately 99%. The resolution (R) can be calculated from the formula:

$$R = \frac{\text{wt. pure isomer separated} - (\text{wt. pure isomer added} + \text{wt. seed})}{\text{wt. of isomer in original charge of DL}}$$

$$= \frac{.1164 - (0.0600 + 0.0174)}{0.12} = 32.5\%$$

EXAMPLE 5

In a procedure similar to that of Example 3, glutamic acid compound was partially precipitated from a 40-ml. aqueous solution containing 0.5000 gram of the DL-form and 0.1500 gram of the L-form of the compound, and 0.0174 gram of the L-form as seed, by adding 7.5 ml. of absolute ethyl alcohol to the solution over a one and one-half hour period and allowing the solution to stand for an additional quarter of an hour before separating the precipitate. From the 0.2514 gram precipitate, a 0.2371 gram fraction was taken and dissolved in 3 ml. 1.75 N hydrochloric acid and the average rotation was $\alpha = +4.30°$, indicating that 0.2392 gram of the precipitate was the L-form. $P = 95.1\%$, and $R = 28.7\%$.

EXAMPLE 6

Under conditions the same as those of Example 2, except that a 45-minute cooling time was used, 0.0912 gram of crystalline material was obtained; the resolution was 10% and the purity was 49.7%.

EXAMPLE 7

Utilizing the procedure of Example 2, except that the crystallization time was 30 minutes, the resolution was 22.4% and the purity was 97.2%. The important effect of the crystallization time is demonstrated by this example in which a shorter crystallization time greatly improved the resolution and purity over Example 6.

A series of resolution procedures were run on glutamic acid solutions under various conditions as set forth in Table I below. The solutions were formed by dissolving the recorded amounts in 10 ml. water at 65° C., except when the crystallization temperature was 50° C. or higher. For the crystallizations at 50° C., the solution was prepared at 75°, 80° or 85° C., and for the 70° crystallization the solids were dissolved at 90° C. As seed, 0.0192 gram of the L-form was used.

*Table I*

RESOLUTION OF GLUTAMIC ACID BY DIRECTED CRYSTALLIZATION

| Amount Racemate (gram) | Amount L-Form (gram) | Temp. (° C.) | Time (minutes) | Purity (percent) | Resolution (percent) |
|---|---|---|---|---|---|
| 0.2400 | 0.0600 | 0 | 60 | 47.5 | 9.6 |
| 0.2400 | 0.0600 | 0 | 45 | 49.7 | 10.0 |
| 0.2400 | 0.0600 | 0 | 30 | 97.2 | 22.4 |
| 0.2400 | 0.0600 | 20 | 30 | ------ | ------ |
| 0.2600 | 0.0600 | 20 | 30 | ------ | ------ |
| 0.2800 | 0.0600 | 20 | 30 | ------ | ------ |
| 0.3000 | 0.0600 | 20 | 30 | 99.7 | 3.7 |
| 0.3200 | 0.0600 | 20 | 30 | 99.2 | 9.0 |
| 0.3800 | 0.0600 | 30 | 30 | ------ | ------ |
| 0.4000 | 0.0600 | 30 | 30 | 97.9 | 0 |
| 0.4200 | 0.0600 | 30 | 30 | 96.7 | 0.95 |
| 0.4400 | 0.0600 | 30 | 30 | 98.2 | 7.7 |
| 0.7000 | 0.0600 | 50 | 30 | ------ | ------ |
| 0.7000 | 0.1200 | 50 | 30 | ------ | ------ |
| 0.7800 | 0.0600 | 50 | 30 | 97.7 | 1.05 |
| 0.8000 | 0.0600 | 50 | 30 | 98.0 | 2.3 |
| 1.6000 | 0.0600 | 70 | 30 | 96.2 | 3.1 |

Where no values are recorded for the purity and resolution, the amount of precipitate was less than the amount of optical isomer put into the system.

It will be noted from Table I that smaller amounts of racemates can be used with lower crystallization temperatures, and greater amounts with higher crystallization temperatures. It is also apparent that a considerable variation in the ratio of the L-form to the racemate can be used.

A number of runs as set forth in Table II were made to determine the effect of varying the amount of glutamic acid racemate in the system. The dissolution temperature was 75° C., the crystallization temperature 20° C. and the crystallization time was 30 minutes.

Table II
RESOLUTION—EFFECT OF THE AMOUNT OF RACEMATE

| Amount Racemate (gram) | Amount L-form (gram) | Purity (percent) | Resolution (percent) |
|---|---|---|---|
| 0.3400 | 0.0600 | 100 | 13.2 |
| 0.3600 | 0.0600 | 100 | 15.7 |
| 0.3800 | 0.0600 | 99.8 | 18.9 |
| 0.4000 | 0.0600 | 98.5 | 19.9 |
| 0.4200 | 0.0600 | 48.1 | 19.0 |
| 0.4400 | 0.0600 | 100 | 28.9 |
| 0.4400 | 0.0600 | 60.5 | 26.6 |
| 0.4200 | 0.0600 | 100 | 26.0 |
| 0.4400 | 0.0600 | 31.4 | 17.4 |
| 0.4200 | 0.0600 | 100 | 26.7 |

The solutions in the above runs were seeded with 0.0192 gram of the L-form.

The importance of the amount of racemate is readily apparent from Table II, even though all of the amounts used are well above the maximum supersaturation amount for the racemate. With respect to the amounts of racemate greater than 0.3600 gram, they represent a supersaturation of over 100% of the amount which would remain in solution in the absence of the L-form. The erratic results with the 0.4400 gram amount indicate that concentrations are being approached which would cause large quantities of the racemate to precipitate under the resolution conditions.

In Table III below there are recorded the amounts of racemate remaining in solution under conditions identical to those of the Table II procedures, except that no L-form was present and the solutions were seeded with DL-form.

Table III
AMOUNTS OF RACEMATE REMAINING IN SOLUTION AT 20° C.

| Amount of Racemate Dissolved (gram) | Amount of Racemate Remaining in Solution After 30 min. (gram) |
|---|---|
| 0.3600 | 0.1890 |
| 0.3800 | 0.1885 |
| 0.4000 | 0.1555 |
| 0.4200 | 0.1445 |

Upon considering Table III in conjunction with Table II, the great amount of supersaturation of the solutions with racemate in the best resolution procedures becomes readily apparent.

In Table IV below a series of procedures are recorded which show the effect of time upon the resolution. The procedures utilized a 0.4200 gram amount of glutamic acid racemate and 0.0600 gram of the L-form of the same in 10 ml. distilled water and a crystallization temperature of 20° C.

Table IV
RESOLUTION—EFFECT OF TIME

| Crystallization Time (minutes) | Purity (percent) | Resolution (percent) |
|---|---|---|
| 20 | 100 | 31.6 |
| 25 | 73.0 | 31.6 |
| 30 | 43.7 | 19.1 |
| 35 | 49.5 | 22.6 |
| 40 | 47.7 | 21.4 |

It appears from Table IV that about 20 minutes is the optimum crystallization time, at least for the specified conditions.

EXAMPLE 8

A resolution run was made to determine the effect of longer crystallization times. The conditions were the same as those of the procedures of Table IV, except that the crystallization time was 2½ hours. Of the 0.3371 gram precipitate, 0.0672 gram was the L-form and the balance was racemate. The 0.0672 gram of L-form was slightly less than the L-form which had been added, indicating that no resolution had occurred, and an approximate equilibrium had been attained.

In a repetition of the above procedure, the precipitate was 0.3210 gram and the amount of L-form in the precipitate was approximately that placed in the system.

It has been shown that resolution of glutamic acid can be achieved using 0.24 to 1.6 grams of racemate and quantities up to about 30% by weight thereof of one active form in 10 ml. of water in suitable combination with crystallization temperatures of about 0 to 70° C. and crystallization conditions under which equilibrium is not attained. The above amounts are greater for higher temperatures and lesser for lower temperatures. While greater or lesser amounts of glutamic acid racemate than the above can be used, it is necessary that the racemate in solution exceed the maximum supersaturation amount, i.e., it must exceed the maximum amount of the racemate which the solvent will hold in solution at the crystallization temperature for a selected cooling (or crystallization) time (equilibrium not being attained). The maximum supersaturation amount can readily be determined for given conditions by simply dissolving various quantities of the glutamic acid racemate, cooling and seeding, observing the corresponding amounts which remain in solution under the particular conditions, and drawing a curve through the values for the amounts in solution and noting the maximum value on the curve. For good results, the amount of racemate in solution will usually exceed the maximum supersaturation amount by 50% or more. While the solutions should contain sufficient racemate to be greatly supersaturated and crystallizable, the amount of racemate should not be so great as to cause large amounts of racemate to crystallize as such under the resolution conditions and to constitute a large part of the product. The amount of optically active isomer which must be present can vary considerably, e.g., from 1 or 2% up to 25 or 30% by weight based upon the amount of racemate. Smaller but significant amounts of optical isomer can be used, and it is also possible to use amounts greater than the above range; however, the use of larger amounts is rather impractical as it requires crystallizing large amounts of the added optical isomers and decreases the percentage of product which actually results from resolution of the racemate.

Novel aqueous solutions containing 0.3 to 0.45 gram of glutamic acid racemate per 10 ml. water and up to 25% of an optical enantiomorph of glutamic acid are particularly valuable as intermediate compositions for the resolution, especially those solutions containing 0.4 to 0.45 gram of glutamic acid racemate.

Any temperature in the range of about 0° C. to 80° C., more or less, are effective as the crystallization temperatures. Higher or lower temperatures can also be used, although they are less conveniently obtained. The term "crystallization temperature" refers to the temperature at which the compound is permitted to crystallize. Temperatures of the order of 0° to 25° C., particularly ordinary room temperatures or slightly therebelow, e.g., 15° to 25° C., can be conveniently used to effect crystallization. Temperatures of the order of 0 to 10° C. are very suitable, although ordinary room temperatures or such other temperatures as can readily be obtained by water cooling might be preferred because of economic considerations.

The crystallization time can be varied considerably, but must be sufficient for more than the amount of optical isomer originally present to crystallize, and must be less than the time for equilibrium to be attained between the optical enantiomorphs in solution and those in the solid state. The "crystallization time" refers to the actual time held at the crystallization temperature, as the time to cool to this temperature is almost instantaneous.

The operative crystallization times will vary considerably, being dependent on temperature, size of seed, stirring rate, etc., and sometimes extending up to two hours or more; however, the crystallization time will ordinarily be in the range of 5 to 60 minutes, and preferably in the range of 20 to 30 minutes.

Although the general procedures and principles taught herein are considered generally applicable in the resolution of glutamic acid by crystallization, it will be appreciated that the actual numerical quantities may vary to some extent with the type of apparatus and other process variables which may be used in large scale production.

My resolution procedure is conducted in a solvent in which the glutamic acid monohydrate is sparingly soluble at the chosen crystallization temperature, but in which the compound can be dissolved and from which it can be crystallized and separated in substantial amounts in a practical operating range of temperatures, e.g., 0° C. to 80° C. It is also desirable that the solvent be one in which the racemic mixture of the compound has a greater solubility or tendency toward supersaturation than the optically active form, each in the presence of the other, at the chosen crystallization temperature. Aqueous media are suitable solvents. Water itself is the preferred solvent. Aqueous alcoholic solutions are suitable, e.g., aqueous solutions containing methyl alcohol, ethyl alcohol, isopropyl alcohol, etc. When these aqueous alcoholic solutions are used as solvents, the fundamentals of the systems will conform to those principles taught herein principally with regard to water as solvent, although the actual numerical values for the systems will differ.

While the preferred method of inducing crystallization is by cooling and seeding the glutamic acid solutions, it will be realized that other means of causing insolubility and precipitation can be used, e.g., adding non-solvents or poor solvents for the compound, such as addition of ethanol to a solution of the compound in water; and that such other means can be used alone or in combination with cooling means; the term "crystallizing" is intended to cover all such fractional precipitation methods. It will be realized, of course, that when crystallization is induced by addition of nonsolvent, the "maximum supersaturation amount" and other fundamental terms will be considered with reference to the composition of the solution at the time of crystallization. The solubility of glutamic acid can be modified by formation of various salts, e.g., the hydrochloride or hydrobromide salts, and these salts can then be used in my resolution procedure, although some adjustment in numerical quantities will be required. As the resolution of these salt forms of glutamic acid will be governed by the same general principles as apply in the resolution of glutamic acid monohydrate, such resolution is considered within the contemplation of my invention.

For seeding the supersaturated solutions containing an excess of one optical enantiomorph, any substantial but reasonably small amount of seed can be used. In fact, now that the feasibility and fundamental principles of the resolution of glutamic acid racemates by selective crystallization have been discussed, it will be possible to dispense with the seeding altogether by suitably modifying the processes illustrated herein; such modified processes are contemplated as part of the present invention. However, the use of seed according to the described methods is considered to be the preferred and most practical method.

While the illustrative examples herein involve separation of the levo-isomer, as this isomer is usually of greatest interest, it will be recognized that the same procedure can be used to separate the dextro-isomer, by crystallizing from solutions containing excess dextro-isomer, and by seeding the solutions with the dextro-isomer. Moreover, it is apparent that after the crystallized solids are separated from the mother liquor in the examples in which resolution was achieved, the mother liquor will be rich in the enantiomorph opposite to that in which the crystallized solids are rich. This makes it possible to conduct a series of directed alternate crystallizations of the glutamic acid to separate both the D- and L-forms from a racemic mixture. In such a procedure, once a solution containing unequal amounts of enantiomorphs is obtained, it is only necessary to add sufficient of the DL-form after each step to give the solution the required degree of supersaturation with respect to the DL-form. The separate, collected fractions of the two isomers can be separately recrystallized from the same or different solvents than those used for the resolution procedures. For such recrystallizations it is usually desirable to use approximately the amount of solvent required to dissolve all of the racemic mixture in the separate, collected fractions, in order to crystallize the individual isomers in the pure state. If desired, either isomer can be racemized by known racemization procedures, and the racemate can then be resolved by my crystallization procedure, thus, in effect, converting one isomer into the other.

The good resolution and purity obtained in some of the above examples indicates that a racemic mixture of glutamic acid can be efficiently separated into its optical isomers by a small number of crystallization steps. This represents a big improvement over prior art resolution procedures.

A method of resolving glutamic acid racemate by preferential crystallization of one optical enantiomorph of glutamic acid from a supersaturated, crystallizing solution of glutamic acid racemate in the presence of said optical enantiomorph has been described. Solutions of glutamic acid in water containing 0.3 to 0.45 gram of glutamic acid monohydrate racemate and a smaller quantity of an optically active form of glutamic acid monohydrate per 10 ml. water, and which are particularly suitable for the resolution of glutamic acid racemate by preferential crystallization have been described.

I claim:

1. The method of resolving DL-glutamic acid monohydrate which comprises crystallizing glutamic acid from an aqueous solution of the DL-glutamic monohydrate and up to 30% by weight based on said DL-glutamic acid of the L optical isomer of glutamic acid monohydrate, the amount of DL-glutamic acid monohydrate being greater than the maximum supersaturation amount for the crystallization time and temperature and at least 0.24 gram but not greater than 0.45 gram per 10 ml. water, and stopping the crystallization after an amount of said optical isomer greater than that originally present as such has crystallized and prior to attainment of equilibrium and recovering the crystallized glutamic and product.

2. The method of claim 1 in which the solution consists of water, DL-glutamic acid monohydrate and an optical isomer of glutamic acid monohydrate, and the crystallization occurs at 0° C. for sixty minutes.

3. The method of claim 1 in which the solution contains lower saturated alcohol.

4. The method of resolution of glutamic acid racemate which comprises crystallizing glutamic acid from a solution comprising 0.3 to 0.45 gram of glutamic acid monohydrate racemate per 10 ml. water and an amount of the L-form of said glutamic acid monohydrate no greater than 25% by weight of said racemate at a temperature of 15° to 25° C. in a crystallization time period of 5 to 60 minutes and recovering the crystallized glutamic acid product.

5. The method of claim 4 in which the amount of racemate is 0.4 to 0.45 gram, the temperature 20° C., and the crystallization time is 20 to 30 minutes.

6. The method of claim 4 in which the said solution is in water itself.

7. The method of resolving a racemate of glutamic acid which comprises crystallizing glutamic acid from an aqueous solution containing the glutamic acid racemate and an additional amount of L-glutamic acid optical isomer, the amount of said racemate in solution being about 100% to about 244% greater than amount of said racemate which would remain in solution under the crystallization conditions and being at least 0.24 gram but not greater than 0.45 gram per 10 ml. water, and stopping the crystallization prior to attainment of equilibrium and recovering the crystallized glutamic acid product.

8. The method of resolving DL-glutamic acid monohydrate which comprises dissolving in water by heat DL-glutamic monohydrate and up to 30% by weight based on said monohydrate of the L optical isomer of glutamic acid monohydrate, the amount of DL-glutamic acid monohydrate being greater than the maximum supersaturation amount for the crystallization time and temperature but not greater than 0.45 gram per 10 ml. water, rapidly cooling the resulting solution to the desired crystallization temperature, stopping the crystallization after an amount of said optical isomer greater than that originally present as such has crystallized and prior to attainment of equilibrium and recovering the crystallized glutamic acid product.

9. The method of resolving a racemate of glutamic acid monohydrate which comprises dissolving a racemate of glutamic acid monohydrate and an additional amount of the L optical isomer thereof in water by heating, cooling the resulting solution rapidly to a lower crystallization temperature, the amount of racemate in solution at the lower crystallization temperature being greater than the maximum amount for the crystallization conditions but not more than about 244% greater than the amount of said racemate which would remain in solution under the crystallization conditions, seeding with the aforesaid optical isomer, and stopping the crystallization prior to attainment of equilibrium and recovering the crystallized glutamic acid product.

References Cited in the file of this patent

UNITED STATES PATENTS

| | | |
|---|---|---|
| 2,734,919 | Amiard et al. | Feb. 14, 1956 |
| 2,940,998 | Ogawa et al. | June 14, 1960 |

FOREIGN PATENTS

| | | |
|---|---|---|
| 2972/56 | Japan | Apr. 20, 1956 |
| 543,617 | Belgium | June 14, 1956 |

OTHER REFERENCES

Gilman: Organic Chemistry (2nd Ed.), Vol I (1938), pages 254–5.

Houben: Die Methoden der Org. Chem., Vol. II (1943), page 1065.

Greenberg: Amino Acids and Proteins, pages 61–2, 117 (1951).